(12) United States Patent
Burckart et al.

(10) Patent No.: US 9,465,601 B2
(45) Date of Patent: *Oct. 11, 2016

(54) PLUGGABLE ACTIVATION ENGINE EXTENSIONS VIA VIRTUAL DISKS

(75) Inventors: Erik J. Burckart, Raleigh, NC (US); Andrew Ivory, Wake Forest, NC (US); Arthur J. Meloy, Raleigh, NC (US); Aaron K. Shook, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1618 days.

This patent is subject to a terminal disclaimer.

(21) Appl. No.: 12/763,521

(22) Filed: Apr. 20, 2010

(65) Prior Publication Data

US 2011/0258622 A1 Oct. 20, 2011

(51) Int. Cl.
*G06F 9/455* (2006.01)
*G06F 9/445* (2006.01)

(52) U.S. Cl.
CPC . *G06F 8/63* (2013.01); *G06F 8/65* (2013.01); *G06F 9/45558* (2013.01); *G06F 2009/45587* (2013.01)

(58) Field of Classification Search
USPC .......................................................... 718/1
See application file for complete search history.

(56) References Cited

U.S. PATENT DOCUMENTS

| | | | |
|---|---|---|---|
| 6,393,560 B1 | 5/2002 | Merrill et al. | |
| 7,293,168 B2 | 11/2007 | Maeda et al. | |
| 2002/0100036 A1 | 7/2002 | Moshir et al. | |
| 2005/0149716 A1 | 7/2005 | Nair et al. | |
| 2005/0257214 A1 | 11/2005 | Moshir et al. | |
| 2006/0155735 A1 | 7/2006 | Traut et al. | |
| 2006/0174240 A1 | 8/2006 | Flynn | |
| 2006/0218544 A1* | 9/2006 | Chakraborty et al. | 717/168 |
| 2007/0094348 A1 | 4/2007 | Scheidel et al. | |
| 2008/0256534 A1* | 10/2008 | Chess et al. | 718/1 |
| 2008/0270583 A1 | 10/2008 | Gonzalez et al. | |
| 2009/0007105 A1 | 1/2009 | Fries et al. | |
| 2009/0094576 A1 | 4/2009 | Bouchard et al. | |
| 2009/0172662 A1 | 7/2009 | Liu | |
| 2009/0260007 A1 | 10/2009 | Beaty et al. | |
| 2009/0282404 A1 | 11/2009 | Khandekar et al. | |
| 2009/0300604 A1* | 12/2009 | Barringer | 717/178 |
| 2009/0320014 A1 | 12/2009 | Sudhakar | |
| 2009/0328030 A1 | 12/2009 | Fries | |
| 2010/0058327 A1* | 3/2010 | Dehaan | 717/176 |
| 2011/0029966 A1 | 2/2011 | Moshir et al. | |
| 2011/0093849 A1* | 4/2011 | Chawla et al. | 718/1 |

(Continued)

OTHER PUBLICATIONS

Smith, J.; Nair, R., "Virtual Machines: Versatile Platforms for Systems and Processes" (Jun. 3, 2005), Morgan Kaufmann Publishers, pp. 1-611.*

(Continued)

*Primary Examiner* — Brian W Wathen
(74) *Attorney, Agent, or Firm* — Law Office of Jim Boice

(57) ABSTRACT

A computer-implemented method, system and/or computer program product configure an extended virtual machine. A virtual image is executed to initialize a virtual machine. An activation engine is activated to search for special extensions in the virtual image. The virtual machine scans at least one virtual disk for script to implement the special extensions as virtual machine extensions, such that the virtual machine reads and executes the extensions prior to being available for use.

12 Claims, 4 Drawing Sheets

(56) References Cited

U.S. PATENT DOCUMENTS

2011/0197188 A1* 8/2011 Srinivasan et al. ............... 718/1
2011/0213875 A1 9/2011 Ferris et al.

OTHER PUBLICATIONS

Rittinghouse, J.; Ransome, J., "Cloud Computing: Implementation, Management, and Security" (Aug. 17, 2009), CRC Press, pp. 1-296.*
Hess, K.; Newman, A., "Practical Virtualization Solutions: Virtualization from the Trenches", (Oct. 22, 2009), pp. 1-24.*
Schwarzkopf, R.; Schmidt, M.; Fallenbeck, N.; Freisleben, B., "Multi-layered Virtual Machines for Security Updates in Grid Environments," (Aug. 27-29, 2009), 35th Euromicro Conference on Software Engineering and Advanced Applications, pp. 563-570 [retrieved from http://ieeexplore.ieee.org/stamp/stamp.jsp?tp=&arnumber=5350011&isnumber=5349835].*
Nolan, J.; Nolan-Haley, J.; Connolly, M.J.; Hicks, S.; Alibrandi, M., Black's Law Dictionary (1990), p. 979.*
Wikipedia, "INIT", Mar. 7, 2010, pp. 1-4, http://en.wikipedia.org/w/index.php?title=Init&oldid=348349356.
S. Yamasaki et al., "Model-Based Resource Selection for Efficient Virtual Cluster Deployment", Virtualization Technology in Distributed Computing, 2007, Second International Workshop on, ACM, Piscataway, NJ, USA, Nov. 12, 2007, pp. 1-7.
International Searching Authority, International Search Report and Written Opinion for International Application No. PCT/EP2011/055547, Mailed Jul. 7, 2011, pp. 1-15.
Foster et al., "Virtual Clusters for Grid Communities", Sixth IEEE International Symposium on Cluster Computing and the Grid, pp. 513-520, May 16, 2006.
U.S. Appl. No. 13/417,113—Non-Final Office Action Mailed May 19, 2014.
U.S. Appl. No. 13/417,113—Notice of Allowance Mailed Aug. 8, 2014.
T. Chieu et al., "Dynamic Scaling of Web Applications in a Virtualized Cloud Computing Environment", IEEE, International Conference on e-Business Engineering, 2009, pp. 281-286.

* cited by examiner

PLUGGABLE ACTIVATION ENGINE EXTENSIONS VIA VIRTUAL DISKS

BACKGROUND

The present disclosure relates to the field of computers, and specifically to virtual computing devices. Still more particularly, the present disclosure relates to configuring virtual computing devices.

BRIEF SUMMARY

A computer-implemented method, system and/or computer program product configure an extended virtual machine. A virtual image is executed to initialize a virtual machine. An activation engine is activated to search for special extensions in the virtual image. The virtual machine scans at least one virtual disk for script to implement the special extensions as virtual machine extensions, such that the virtual machine reads and executes the extensions prior to being available for use.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
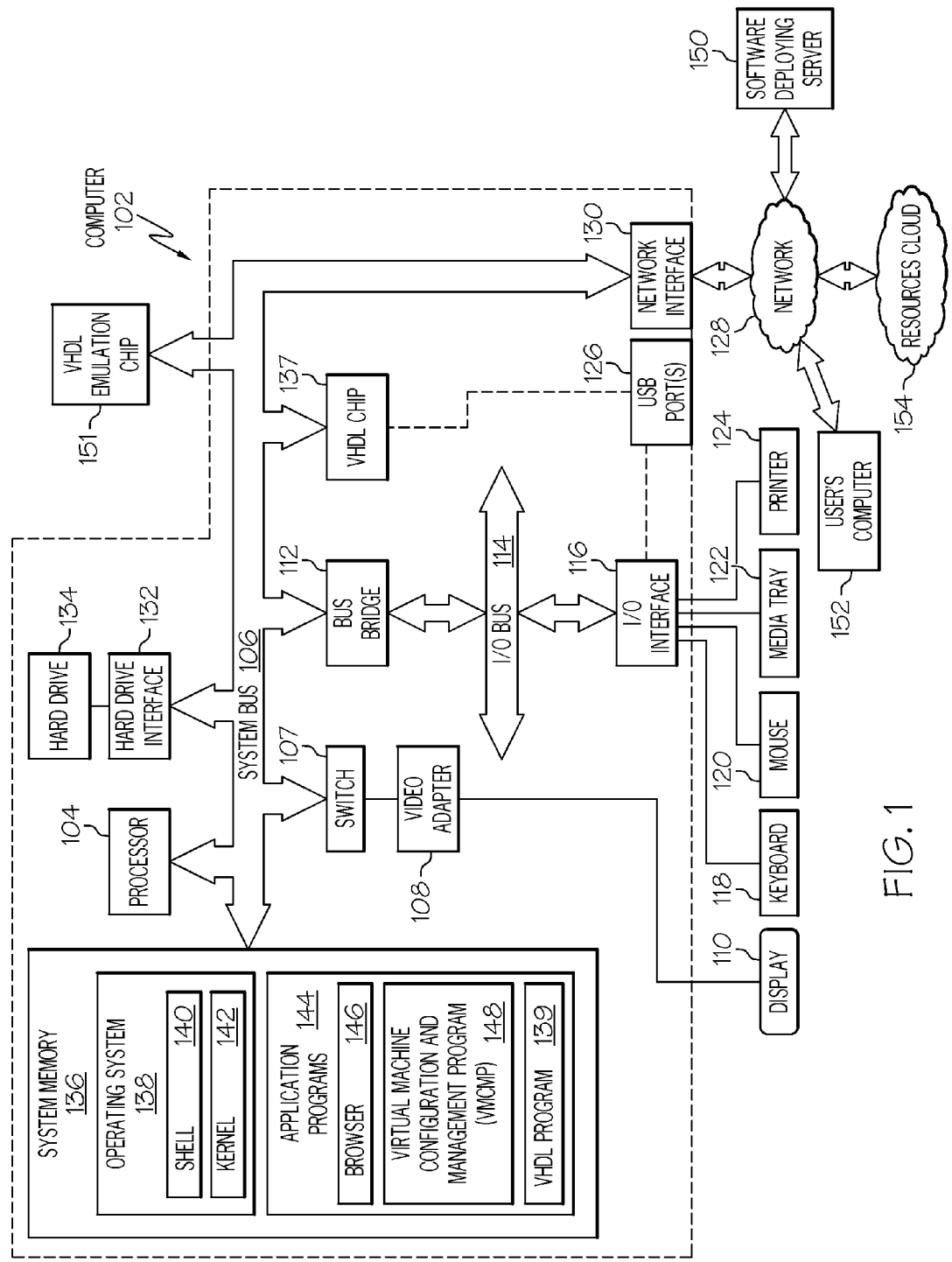
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150 and/or user's computer 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, preferably mechanical, that allows the display 110 to be coupled to the system bus 106, and thus to be functional only upon execution of instructions (e.g., virtual machine configuration and management program—VMCMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in a preferred embodiment some or all of these ports are universal serial bus (USB) ports.

As depicted, computer 102 is able to communicate with a software deploying server 150, user's computer 152 and/or resources cloud 154 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a virtual machine configuration and management program (VMCMP) 148. VMCMP 148 includes code for implementing the processes described below, including those described in FIGS. 2-4. In one embodiment, computer 102 is able to download VMCMP 148 from software deploying server 150, including in an on-demand basis, such that the code from VMCMP 148 is not downloaded until runtime or otherwise immediately needed by computer 102. Note further that, in one embodiment of the present disclosure, software deploying server 150 performs all of the functions associated with the present disclosure (including execution of VMCMP 148), thus freeing computer 102 from having to use its own internal computing resources to execute VMCMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from VMCMP 148 causes VHDL program 139 to configure VHDL chip 137, which may be an FPGA, ASIC, etc.

In another embodiment of the present disclosure, execution of instructions from VMCMP 148 results in a utilization of VHDL program 139 to program a VHDL emulation chip 151. VHDL emulation chip 151 may incorporate a similar architecture as described herein for VHDL chip 137. Once VMCMP 148 and VHDL program 139 program VHDL emulation chip 151, VHDL emulation chip 151 performs, as hardware, some or all functions described by one or more executions of some or all of the instructions found in VMCMP 148. That is, the VHDL emulation chip 151 is a hardware emulation of some or all of the software instructions found in VMCMP 148. In one embodiment, VHDL emulation chip 151 is a programmable read only memory (PROM) that, once burned in accordance with instructions from VMCMP 148 and VHDL program 139, is permanently transformed into a new circuitry that performs the functions needed to perform the process described below in FIGS. 2-4.

Resources cloud 154 supports cloud computing, in which software and hardware resources are shared. In one embodiment, the virtual disks and/or virtual machines described herein reside within the resources cloud 154, which is supported by multiple physical machines (not shown).

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
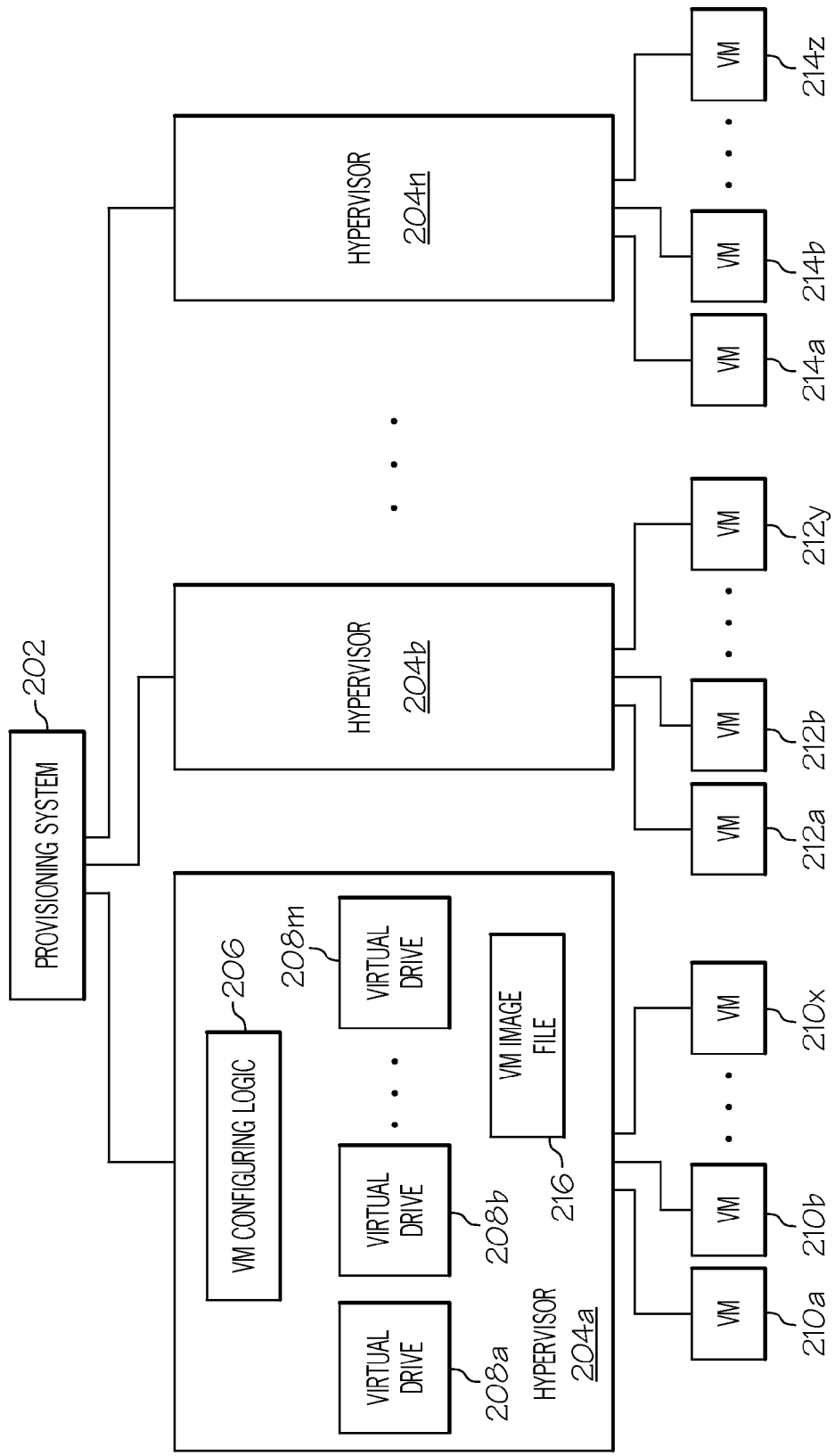
FIG. 2 illustrates an exemplary environment in which virtual machines are configured and managed during operation.

With reference now to FIG. 2, an exemplary environment in which extended virtual machines (EVMs) are configured and managed during operation in accordance with one embodiment of the present disclosure is presented. A provisioning system 202, which may reside on a computer such as computer 102 shown in FIG. 1, supervises operations of multiple hypervisors 204*a-n* (where "n" is an integer). Through the use of virtual machine (VM) configuring logic 206 and virtual drives 208*a-m* (where "m" is an integer"), both of which may be part of VMCMP 148 described above, hypervisor 204*a* is able to configure, manage and operate multiple VMs 210*a-x* (where "x" is an integer). Note that hypervisor 204*b* and hypervisor 204*n* have a similar construction as hypervisor 204*a*, and are respectively able to configure, manage and operate multiple VMs 212*a-y* (where "y" is an integer) and multiple VMs 214*a-z* (where "z" is an integer). In accordance with one embodiment of the present disclosure, when one of the VMs 210*a-x* is extended into an extended VM (as described herein), a complete image of that extended VM need not be transferred to the VM image file 216 in the hypervisor 204*a*. Rather, only a main VM image file and tags to extensions need be stored in the VM image file 216.

Note that provisioning system 202, hypervisors 204*a-n*, and/or all VMs shown in FIG. 2 may reside in computer 102, resources cloud 154, and/or be distributed between the computer 102 and resources cloud 154 shown in FIG. 1.

Figure 3:
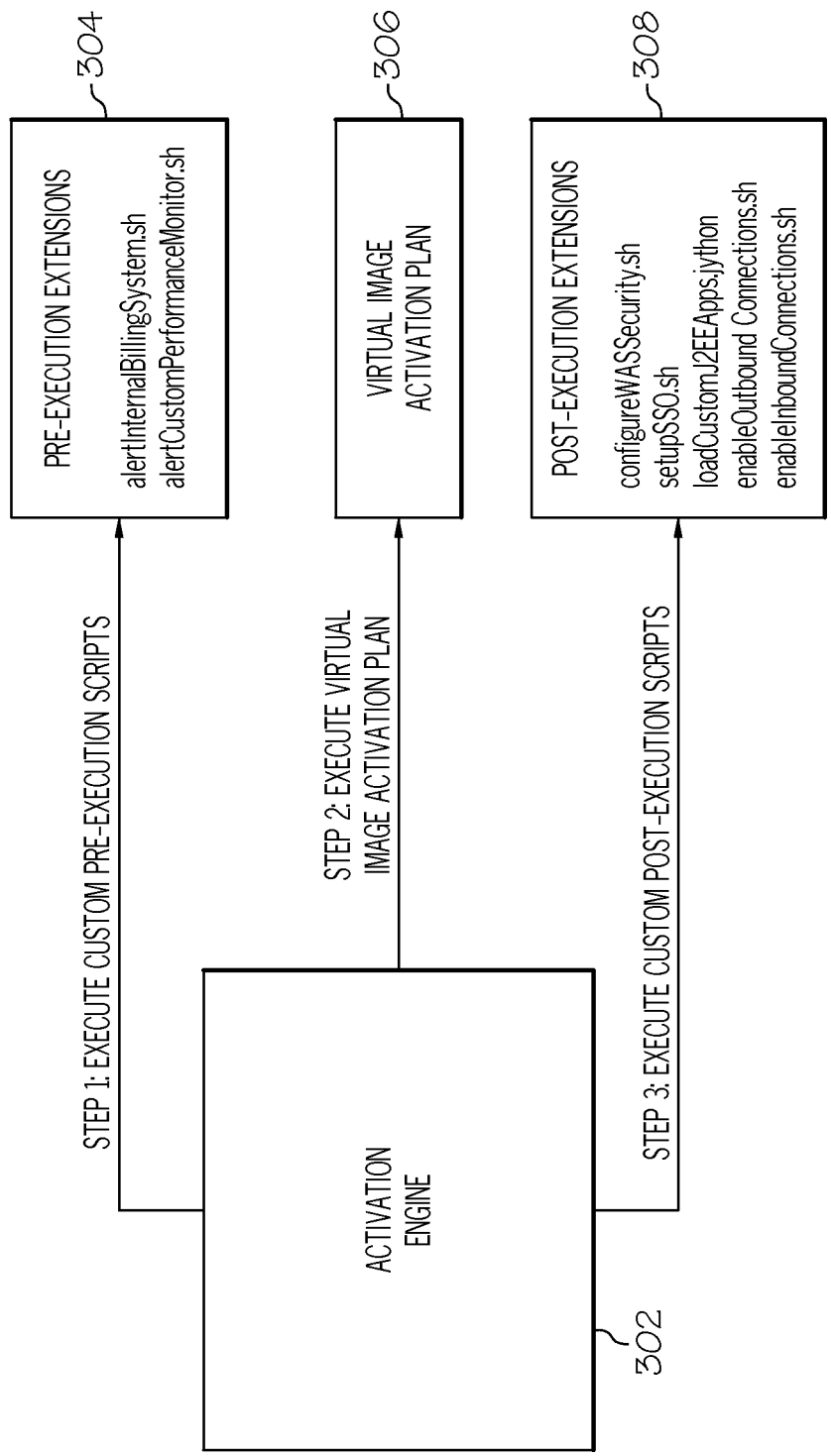
FIG. 3 depicts an activation engine configuring an extended virtual machine in accordance with one embodiment of the present disclosure.

With reference now to FIG. 3, assume that an activation engine 302, which may reside in any hypervisor depicted in FIG. 2, is assigned the duty of implementing an extended virtual machine (EVM). As understood by those skilled in the art of computers, a virtual machine (VM) is a software simulation of a physical computer. Such a VM is able to handle all processes that a physical computer can perform, including storing data, executing instructions, transmitting data across networks, busses, etc. As shown in Step 1 of FIG. 3, the activation engine 302 first executes any custom pre-execution scripts found in an extended virtual image file. An extended virtual image file is a set of instructions that provides instructions for configuring an extended virtual machine. The extended virtual machine includes a main virtual machine, as well as virtual machine extensions. Before creating the main virtual machine, however, pre-execution extensions 304 are run. Execution of such pre-execution extensions 304 can result in establishing billing systems used to charge a user (e.g., the user of user computer 152 shown in FIG. 1) that requested the extended virtual machine (EVM). This billing can be based on the length of time that the EVM is operational, the number of transactions executed by the EVM, the specific abilities (e.g., processing power, transmission bandwidth, memory, etc.) of the EVM, etc. In addition, the pre-execution extensions can result in establishing a custom performance monitor that monitors the activities (e.g., through a dashboard) of the EVM. A billing system and/or custom performance monitor are examples of customization that can be incorporated into the EVM, and should not be construed as being a limited listing of such customizations.

As describe in Step 2, a virtual image activation plan 306 can then be executed to configure the main VM, which along with the virtual machine extensions created by pre-execution extensions 304 and post-execution extensions 308 form the EVM. As described in Step 3, executing the custom post-execution extensions 308 results in additional virtual machine extensions, including security systems (e.g., password protection, encryption, etc.) for the EVM, single sign on (SSO) setup (allowing a single user to sign on to and use multiple EVMs), and the creation of inbound and outbound connections (e.g., virtual ports) to the EVM. Note that pre-execution extensions 304, virtual image activation plan 306, post-execution extensions 308, as well as the main virtual image used to initialize the main virtual machine can be stored in the virtual drives (e.g., 208a-m) located in the hypervisors (e.g., 204a) shown in FIG. 2. Note also that calling the extensions, and thus extending the VM, is performed by the main VM, such that the main VM is able to self-extend/customize itself.

Figure 4:
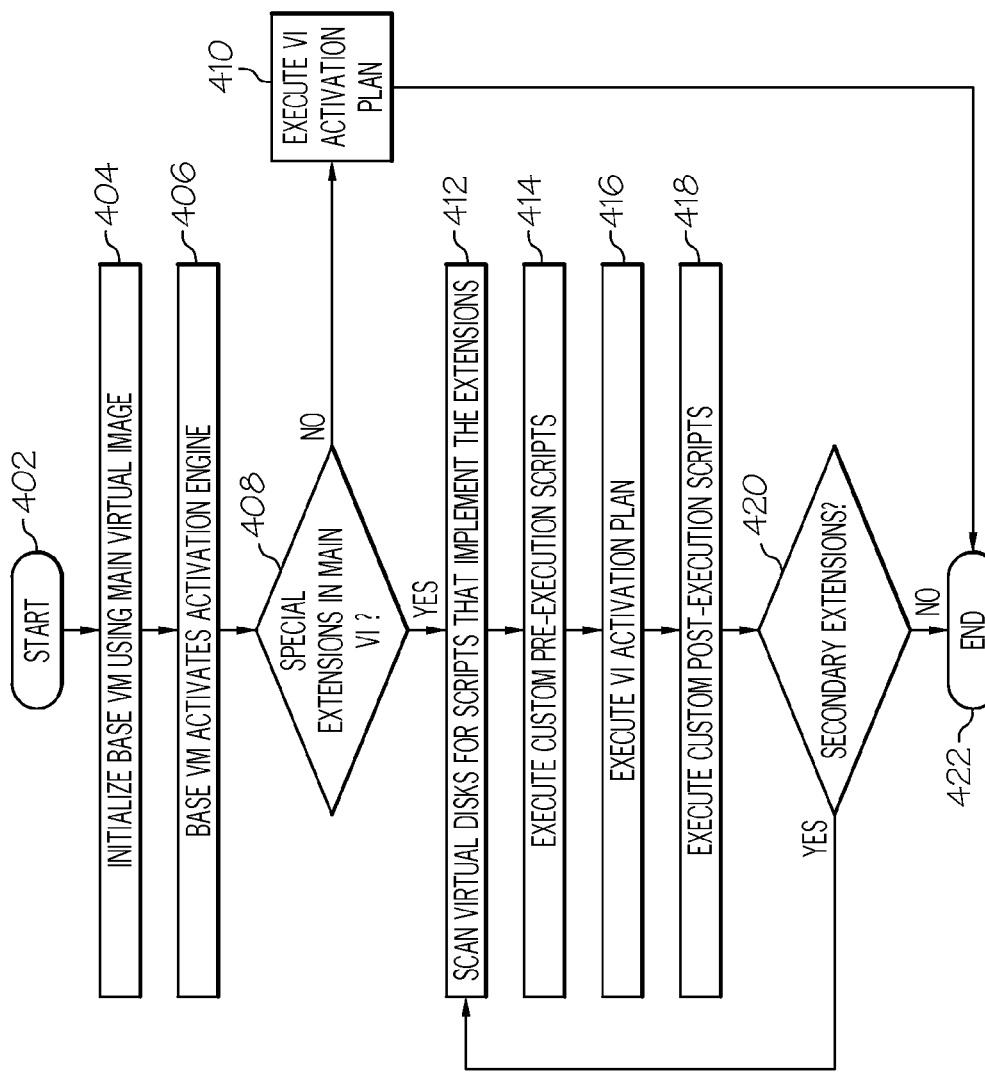
FIG. 4 is a high level flow chart of one or more exemplary steps performed by a processor to configure an extended virtual machine.

With reference now to FIG. 4, a high level flow chart of one or more exemplary steps performed by a processor to configure an extended virtual machine is presented. After initiator block 402, which may be prompted by a user of user computer 152 shown in FIG. 1 requesting that an extended virtual machine (EVM) be configured, a main virtual machine is initialized using a main virtual image (block 404). This "main virtual machine" can be viewed as a "backbone" of the EVM, which is then extended by the pre and/or post extensions described herein by activating (block 406) the activation engine 302 shown in FIG. 3. This activation engine 302, which in one embodiment is part of the main virtual machine, then checks for any special extensions in the main virtual image (query block 408). If there are no such special extensions in the main virtual image (VI), then the VM is activated as a non-extended (traditional) VM (block 410) and the process ends (terminator block 422). However, if there are special extensions in the main VI (query block 408), then the base VM scans/searches through multiple virtual disks (block 412) to locate a script needed to implement the special extensions as virtual machine extensions. Thereafter, the pre-execution scripts are executed (block 414), the main VI activation plan is executed to create the main VM (block 416), and the post-execution scripts are executed (block 418). The script execution described in blocks 414-418 results in the complete EVM being configured and deployed.

As described in query block 420, there may be occasions in which one virtual disk must call on another virtual disk for the desired extension. If so, then these "secondary extensions" are called from a second virtual disk by the first virtual disk, such that several extensions can be chained together and executed sequentially (block 412).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer program product for configuring an extended virtual machine, the computer program product comprising:
   a computer readable storage media;

first program instructions to execute a main virtual image to initialize a main virtual machine;

second program instructions to activate an activation engine to search for special extensions in the main virtual image; and third program instructions to scan at least one virtual disk for script to implement the special extensions as virtual machine extensions, wherein the main virtual machine and the virtual machine extensions combine to configure an extended virtual machine; and wherein the first, second and third program instructions are stored on the computer readable storage media.

2. The computer program product of claim 1, wherein the virtual machine extensions comprise pre-execution extensions that are implemented before the main virtual machine is configured.

3. The computer program product of claim 2, wherein the pre-execution extensions configure a billing system and a performance monitor for the extended virtual machine.

4. The computer program product of claim 1, wherein the virtual machine extensions comprise post-execution extensions that are implemented after the main virtual machine is configured.

5. The computer program product of claim 4, wherein the post-execution extensions configure security, single sign on (SSO) setup, inbound connections and outbound connections for the extended virtual machine.

6. A computer system comprising:

a central processing unit (CPU), a computer readable memory, and a computer readable storage media;

first program instructions to execute a main virtual image to initialize a main virtual machine;

second program instructions to activate an activation engine to search for special extensions in the main virtual image; and third program instructions to scan at least one virtual disk for script to implement the special extensions as virtual machine extensions, wherein the main virtual machine and the virtual machine extensions combine to configure an extended virtual machine; and wherein the first, second and third program instructions are stored on the computer readable storage media for execution by the CPU via the computer readable memory.

7. The computer system of claim 6, wherein the virtual machine extensions comprise pre-execution extensions that are implemented before the main virtual machine is configured.

8. The computer system of claim 7, wherein the pre-execution extensions configure a billing system and a performance monitor for the extended virtual machine.

9. The computer system of claim 6, wherein the virtual machine extensions comprise post-execution extensions that are implemented after the main virtual machine is configured.

10. The computer system of claim 9, wherein the post-execution extensions configure security, single sign on (SSO) setup, inbound connections and outbound connections for the extended virtual machine.

11. The computer system of claim 6, wherein said at least one virtual disk resides in a hypervisor that configures the extended virtual machine.

12. The computer system of claim 6, wherein the extended virtual machine is part of a computer cloud of resources.

* * * * *